Feb. 25, 1930.          J. BROWN ET AL          1,748,055
                         WINDSHIELD WIPER
                        Filed Aug. 16, 1928         2 Sheets-Sheet 1
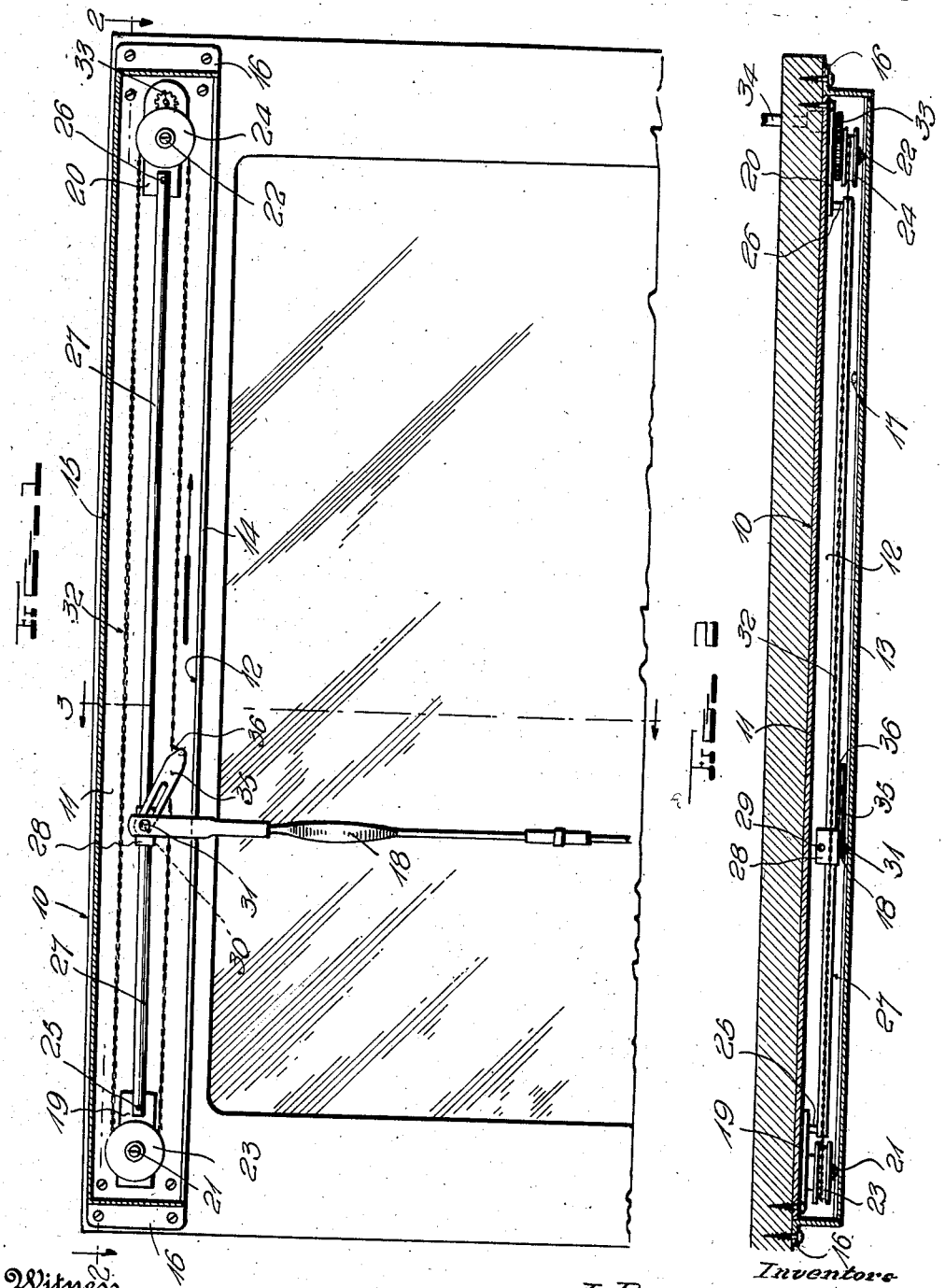
Witness
Inventors
J. Brown,
W. D. Vredenburgh,
By H. B. Willson &co
Attorneys

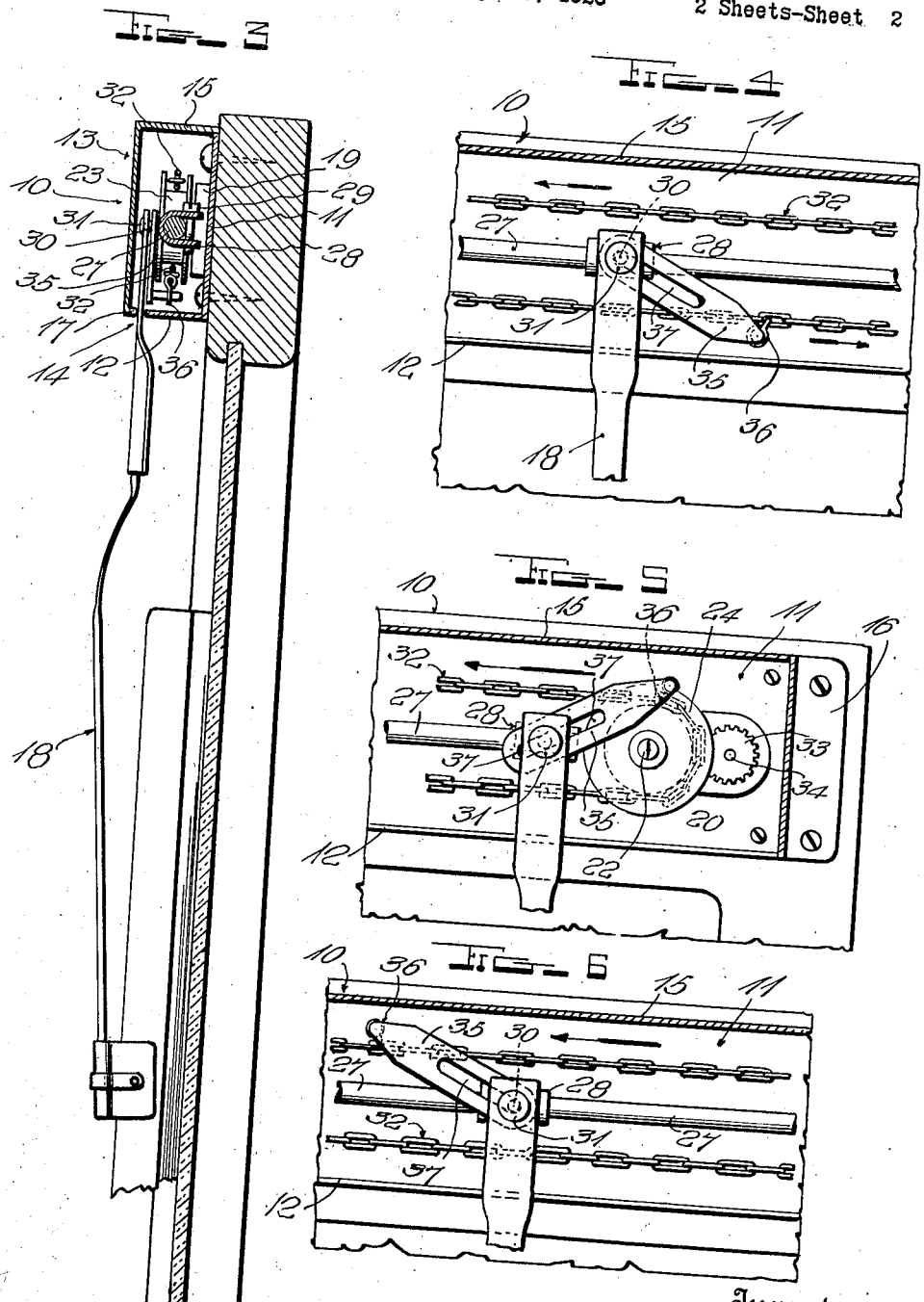

Patented Feb. 25, 1930

1,748,055

UNITED STATES PATENT OFFICE

JAMES BROWN AND WILLIAM D. VREDENBURGH, OF YAKIMA, WASHINGTON

WINDSHIELD WIPER

Application filed August 16, 1923. Serial No. 299,988.

The invention relates to windshield wipers of the general type in which the wiper arm is moved alternately in opposite directions across the shield, through the instrumentality of a chain continuously driven in one direction, and it is the object of said invention to generally simplify and improve upon the construction of wipers of this type.

With the foregoing in view, the invention resides in the novel subject matter hereinafter described and claimed, description being accomplished by reference to the accompanying drawings.

Fig. 1 is a front elevation partly in section.

Fig. 2 is a horizontal sectional view on line 2—2 of Fig. 1.

Fig. 3 is a vertical transverse section on the correspondingly numbered line of Fig. 1.

Figs. 4, 5 and 6 are detail views illustrating the manner in which the slide-operated link is reversed as its pivoted end passes around either of the sprocket wheels.

In the drawing above briefly described, the preferred form of construction has been illustrated and while such construction will be herein specifically described, it is to be understood that within the scope of the invention as claimed, variations may be made.

We employ a horizontally elongated, sheet metal casing 10 to extend along the upper portion of the windshield frame. This casing preferably comprises a back plate 11 having a forwardly projecting flange 12 forming a casing bottom, a front plate 13 spaced somewhat in advance of the flange 12 to leave a slot 14, and a flange 15 projecting rearwardly from the upper edge of said front plate to provide a casing top, the ends of the casing being provided with appropriate closures secured to the parts 13—15 and equipped with outstanding attaching lugs 16 secured either to the wind shield frame or to the back plate 11. The lower edge of the front plate 13 is provided with an inwardly turned bead 17 which bears against the outer side of the usual wiper arm 18 to hold it inwardly toward the wind shield.

The back plate 11 is secured by appropriate fasteners to the wind shield frame and at its ends, the inner side of this back plate is provided with bosses 19—20 carrying studs 21—22 upon which sprockets 23—24 are rotatably mounted, said bosses being also provided with inwardly projecting posts 25—26 to which the ends of a guide rod 27 are anchored. A slide 28 which is U-shaped in transverse section, is slidable along the rod 27, being held against accidental removal therefrom by a vertical screw or the like 29 which passes through the longitudinal edge portions of the slide behind the rod. Rigidly secured to and projecting laterally from the slide 28, is a stud 30 having a reduced outer end 31. The wiper arm 18 is secured upon this stud, by passing the reduced stud end 31 through an opening in the upper end of said arm and upsetting it as shown.

An endless chain 32 is trained around the sprockets 23—24 and one of these sprockets is driven by gearing 33 from a shaft 34 which may be rotated in any desired manner, for instance by an electric motor (not shown). Shaft 34 is continuously driven in the same direction and it follows that the chain 32 is similarly driven. A link 35 is pivoted at one of its ends to the chain 32, the link pivot 36 being transverse to said chain. The other end of the link 35 is formed with a longitudinal slot 37 through which the stud 30 passes loosely, the link being inclined and confined between the wiper arm 18 and the slide 28.

The link 35 is of such a length that the slide 28 will always trail behind the link pivot 36 when the wiper is being operated, so that said link effectively pulls the slide along the rod 27 without any danger whatever of canting it and causing binding. The length of the link slot 37 is such as to permit reversing of the link 35 when its pivot 36 travels around either of the sprockets 23—24, insuring trailing of the slide behind the link regardless of the direction in which the latter is traveling.

It will be seen from the foregoing that exceptionally simple and inexpensive construction has been provided, yet that said construction will be efficient and in every way desirable. As above stated, the details disclosed are preferable. However, within the scope of the invention as claimed, it is to be remembered that minor variations may be made.

We claim:

1. In a device of the class described, a horizontally elongated casing having a slot in its bottom, two sprockets mounted in the ends of said casing, an endless chain trained around said sprockets, a guide rod extending longitudinally between the upper and lower reaches of said chain, means at the ends of said rod mounting it in spaced relation with all longitudinal sides of the casing, a slide movable along said rod, an arm secured to said slide and passing through said slot, an inclined link pivoted at one of its ends to said chain on an axis transverse to the latter, the other end of said link having a longitudinal slot, a stud on said slide loosely received in said slot, and means for continuously driving one of said sprockets, said link being of such length as to insure that the slide shall trail behind the link pivot when being moved in either direction, said slot permitting reversal of the link incident to passage of the link pivot around either of said sprockets.

2. In a device of the class described, a horizontally elongated casing having a slot in its bottom, two sprockets mounted in the ends of said casing, an endless chain trained around said sprockets, a guide rod extending longitudinally between the upper and lower reaches of said chain, means at the ends of said rod mounting it in spaced relation with all longitudinal sides of the casing, a slide movable along said rod, a stud secured to and projecting laterally from said slide, an arm secured to the outer end of said stud and passing through said slot, an inclined link pivoted at one of its ends to said chain on an axis transverse to the latter, the other end of said link having a longitudinal slot through which said stud passes loosely, and means for continuously driving one of said sprockets, said link being of such length as to insure that the slide shall trail behind the link pivot when being moved in either direction, said slot permitting reversal of the link incident to passage of the link pivot around either of said sprockets.

3. In a windshield wiper, a horizontally elongated casing comprising a back plate adapted to be secured to upper portion of a windshield frame and having a forwardly projecting flange forming the bottom of the casing, a front plate spaced from the front edge of said bottom forming a flange whereby a longitudinal slot is formed in the bottom of the casing, a rearwardly projecting flange on the upper edge of said front plate, said flange engaging the upper edge of said back plate and forming the top of the casing, end members secured to said front plate and top forming flange, means for securing said end members to the windshield frame, an inwardly turned bead on the lower edge of said front plate, bosses arranged on the inner side of the back plate, studs formed on said bosses, sprocket wheels mounted on said studs, posts projecting inwardly from said bosses, a longitudinally disposed guide rod anchored at its ends to said posts, a slide movably mounted on said guide rod, a stud projecting laterally from said slide, a wiper arm secured at its upper end to said stud and projecting downwardly through the slot in the casing bottom and having a sliding engagement with the bead on the lower edge of said front plate whereby said arm is held inwardly toward the windshield, an endless chain trained around said sprocket wheels, a link pivoted at one end to one of the links of said chain, a longitudinal slot in the other end of said link to loosely receive the stud on said slide, whereby the slide will trail behind the link when being moved in either direction, said slot permitting reversal of the link incident to passage of the link pivot around either of said sprocket wheels, and means for continuously driving said chain.

In testimony whereof we have hereunto affixed our signatures.

JAMES BROWN.
WILLIAM D. VREDENBURGH.